UNITED STATES PATENT OFFICE.

PAUL SEIDEL, OF LUDWIGSHAFEN-ON-THE-RHINE, GERMANY, ASSIGNOR TO THE BADISCHE ANILIN UND SODA FABRIK, OF LUDWIGSHAFEN-ON-THE-RHINE, GERMANY, A CORPORATION OF BADEN.

PROCESS OF MAKING INDOLIC BODIES.

No. 798,077. Specification of Letters Patent. Patented Aug. 29, 1905.

Application filed October 24, 1902. Serial No. 128,616.

*To all whom it may concern:*

Be it known that I, PAUL SEIDEL, doctor of philosophy and chemist, a subject of the King of Saxony, residing at Ludwigshafen-on-the-Rhine, in the Kingdom of Bavaria, Empire of Germany, have invented new and useful Improvements in the Process of Manufacturing Indolic Bodies, of which the following is a specification.

I have discovered that indol is or indolic bodies are contained in and can be isolated from melts such as are obtained by heating bodies containing the chemical group R-N-$CH_2$-CO (in which R signifies an aromatic radical)—for instance, bodies such as phenyl-glycin, tolyl-glycin, phenyl-glycin-ortho-carboxylic acid, a salt, ester, amid, anilid, or anhydrid of one of these bodies, and the like, and which bodies I will refer to generically as "phenyl-glycin" substances — with alkaline dehydrating agents, such as hydroxids or oxids of the alkalies or alkali earths, either alone or in admixture with inorganic bodies which decompose water.

By my invention I effect an improvement in the manufacture of indigo, for from the waste liquors I recover a valuable by-product, thus cheapening the manufacture of indigo itself. Further, I can by varying the conditions of the melting operation increase the quantity of the by-product, for the quantity of indol formed apparently increases (within certain limits) with the temperature. The addition to the melt of reducing agents—such as finely-divided iron powder, sulfite salts, sodium ethylate, and the like—also augments the yield of indol.

The following examples will serve to further illustrate the nature of my invention; but the invention is not confined to these examples and the conditions described therein. The parts are by weight.

Example 1: Intimately grind together two hundred (200) parts of phenyl-glycin-ortho-carboxylic acid potassium salt and five hundred (500) parts of caustic potash. Heat the mixture for two (2) hours at a temperature of two hundred and ninety degrees centigrade, (290° C.) When cool, dissolve the melt in two hundred (200) times its weight of water, and oxidize this solution by means of air or other suitable agent until no more indigo is precipitated, and filter and isolate the indol from the filtrate, either by extraction by means of ether, benzene, or other suitable solvent, or by distilling it in steam. The indol which distils over with the steam can be isolated from the aqueous distillate in any suitable manner—for example, by treating it with a one (1) per cent. solution of picric acid and as much sulfuric acid (containing about fifty (50) per cent. $H_2SO_4$) as is equal to ten (10) times the quantity of picric acid employed. The precipitate of indol picrate obtained is then worked up for indol, which can be done in the known manner. If desired, the indol can be isolated from the solutions of the melt before separating indigo therefrom.

Example 2: Intimately mix together two hundred (200) parts of phenyl-glycin-ortho-carboxylic acid sodium salt, four hundred (400) parts of caustic soda, and fifty (50) parts of iron powder. Heat the whole for about two (2) hours at a temperature of from two hundred and eighty to three hundred degrees centigrade, (280°-300° C.) Work up the melt as explained in the preceding example.

Example 3: Intimately mix together two hundred (200) parts of phenyl-glycin potassium salt or two hundred (200) parts of phenyl-glycin-ethyl-ester, two hundred (200) parts of caustic potash, two hundred (200) parts of caustic soda, four hundred (400) parts of caustic lime, and one hundred (100) parts of anhydrous sodium sulfite. Heat the mixture for about two (2) hours at a temperature of three hundred degrees centigrade (300° C.) and work up the melt as explained in the preceding Example 1.

I claim—

1. The process of making and isolating indolic bodies by heating a phenyl-glycin substance with an alkaline dehydrating agent, dissolving the melt, treating with an oxidizing agent, getting rid of the indigo precipitated, and from the liquor so obtained isolating the indol formed.

2. The process of making and isolating indolic bodies by heating a phenyl-glycin substance with caustic alkaline substance, dissolving the melt, treating with an oxidizing agent, getting rid of the indigo precipitated, and from the liquor so obtained isolating the indol formed.

3. The process of making and isolating indolic bodies by heating a phenyl-glycin substance with an alkaline dehydrating agent and a reducing agent, dissolving the melt, treating with an oxidizing agent, getting rid of the indigo precipitated and isolating the indol formed.

4. The process of making and isolating indolic bodies by heating a phenyl-glycin substance with caustic alkaline substance and a reducing agent, dissolving the melt, treating with an oxidizing agent, getting rid of the indigo precipitated and isolating the indol formed.

5. The process of making and isolating indolic bodies by heating a phenyl-glycin substance with a mixture of caustic potash, caustic soda and caustic lime, dissolving the melt, treating with an oxidizing agent, getting rid of the indigo precipitated and isolating the indol formed.

6. The process of making and isolating indolic bodies by heating a phenyl-glycin substance with a mixture of caustic potash, caustic soda, caustic lime and sodium sulfite dissolving the melt, treating with an oxidizing agent, getting rid of the indigo precipitated and isolating the indol formed.

7. The process of making and isolating indolic bodies by heating a phenyl-glycin substance with an alkaline dehydrating agent, dissolving the melt, treating with an oxidizing agent, getting rid of the indigo precipitated, and from the liquor so obtained isolating the indolic body formed.

8. The process of making and isolating indolic bodies by heating a phenyl-glycin substance with caustic alkaline substance, dissolving the melt, treating with an oxidizing agent, getting rid of the indigo precipitated, and from the liquor so obtained isolating the indolic body formed.

9. The process of making and isolating indolic bodies by heating a phenyl-glycin substance with an alkaline dehydrating agent and a reducing agent, dissolving the melt, treating with an oxidizing agent, getting rid of the indigo precipitated and isolating the indolic body formed.

10. The process of making and isolating indolic bodies by heating a phenyl-glycin substance with caustic alkaline substance and a reducing agent, dissolving the melt, treating with an oxidizing agent, getting rid of the indigo precipitated and isolating the indolic body formed.

In testimony whereof I have hereunto set my hand in the presence of two subscribing witnesses.

PAUL SEIDEL.

Witnesses:
ERNEST F. EHRHARDT,
JACOB ADRIAN.